United States Patent
Uchiyama et al.

[11] Patent Number: 5,603,846
[45] Date of Patent: Feb. 18, 1997

[54] FRACTIONAL FILTRATION METHOD AND FRACTIONAL FILTRATION APPARATUS

[75] Inventors: Tadao Uchiyama, Funabashi; Koji Tomizama, Asaka, both of Japan

[73] Assignee: Kabushiki Kaisha SYST, Japan

[21] Appl. No.: 398,124

[22] Filed: Mar. 3, 1995

[30] Foreign Application Priority Data

Mar. 3, 1994 [JP] Japan .................................. 6-033952
Jan. 13, 1995 [JP] Japan .................................. 7-004006

[51] Int. Cl.⁶ .................................................. B01D 33/06
[52] U.S. Cl. ................. 210/784; 210/791; 210/803; 210/805; 210/168; 210/171; 210/172; 210/196; 210/326; 210/333.01; 210/391; 210/402; 210/409; 210/416.5; 210/526
[58] Field of Search ...................... 210/779, 780, 210/784, 791, 800, 803, 805, 168, 171, 172, 194, 196, 326, 333.01, 391, 402, 409, 411, 416.5, 526

[56] References Cited

U.S. PATENT DOCUMENTS

| | | | |
|---|---|---|---|
| 1,627,550 | 5/1927 | Bachmann | 210/326 |
| 1,904,066 | 4/1933 | McArthur | 210/326 |
| 2,267,086 | 12/1941 | Donohue | 210/526 |
| 2,969,880 | 1/1961 | Ludholm et al. | 210/526 |
| 4,655,940 | 4/1987 | Harms | 210/168 |
| 4,724,077 | 2/1988 | Uchiyama | 210/394 |
| 4,895,647 | 1/1990 | Uchiyama | 210/171 |
| 4,992,167 | 2/1991 | Uchiyama | 210/171 |
| 5,167,839 | 12/1992 | Widmer, II et al. | 210/168 |
| 5,230,793 | 7/1993 | Lenhart et al. | 210/168 |

FOREIGN PATENT DOCUMENTS 281220 12/1970 U.S.S.R. .................................. 210/326

Primary Examiner—Robert J. Popovics
Attorney, Agent, or Firm—Merchant, Gould, Smith, Edell, Welter & Schmidt

[57] ABSTRACT

A fractional filtration apparatus, used for obtaining cutting oils fractionally cleaned by using one filtration apparatus so as to reuse the separated cutting oils in accordance with the types of machining operations, includes a plurality of liquid tanks for fractionally storing the cleaned cutting oils, a filtration target cutting oil storage tank for temporarily storing a filtration target cutting oil charged through a charge port, rotatably driven filtration drums, dividing the liquid level of the cutting oil and being pivotal in the filtration target cutting oil storage tank, each drum having a side-surface opening in at least one surface thereof in order to let a filtered cleaned cutting oil flow into the cutting oil tanks, and each drum being provided with filters of different mesh sizes, injection nozzles for reversely washing the filters provided on the outer circumferential surfaces of the filtration drums, and dip-up members, disposed at a predetermined intervals, for continuously conveying the cuttings from an upstream side of the discharge port to a downstream side and causing the cuttings to drop through a cuttings discharge port.

16 Claims, 7 Drawing Sheets

FRACTIONAL FILTRATION METHOD AND FRACTIONAL FILTRATION APPARATUS

BACKGROUND OF THE INVENTION

The present invention relates to a fractional filtration method and a fractional filtration apparatus and, more particularly, to a fractional filtration method and a fractional filtration apparatus which can separate cuttings from cutting oils through different filtration steps, thereby obtaining cutting oils for different applications, so that the cutting oils can be reused. The cutting oil to be separated is obtained by fractionally filtering a turbid liquid consisting of a liquid and solid material having different particle sizes after the cutting oil is used in various types of industrial machines and which contains cuttings after being used in, e.g., metal cutting.

Conventionally, many filtration apparatuses have been proposed which separate a cutting oil containing cuttings after it is used in metal cutting into cuttings and cutting oils, thereby obtaining cutting oils (hereinafter referred to as cleaned cutting oils) that can be reused.

The "filtration apparatus" of Japanese Patent Publication No. 2-44564 is an example of an improvement of such a fractional filtration apparatus. According to this apparatus, a filtration drum is lightly rotated by causing its one end to float in a cutting oil so as to decrease the weight applied to the bearing of the filtration drum.

According to the "filtration apparatus" of Japanese Utility Model Application No. 1-31997, floating cuttings which contain air in a continuous helical state during, e.g., lathing, thus obtaining a buoyancy to float on top a cutting oil (to be referred to as a filtration target cutting oil hereinafter) to be filtered which contains cuttings, are caused to settle in the filtration target cutting oil.

When the floating cuttings are left to stand in this state, the floating cuttings accumulate to damage a filter wound on the outer circumferential surface of the filtration drum. This apparatus aims at preventing this damage.

When the cleaned cutting oil cleaned by using one of the above apparatuses is to be used again once or several times, different types of cutting oils may be separately used in accordance with the types of machine tools or the types of cutting operations.

More specifically, when precision cutting is to be performed or when a gun drill or the like is to be used, a new cutting oil or a completely filtered cutting oil which is close to an unused cutting oil is needed. When a cutting oil is used in heavy cutting or rough cutting or is flowed from above to flush cuttings deposited in, e.g., an unmanned factory, into an oil tank, sometimes a completely filtered cutting oil is not always needed.

Where a machining center integrally incorporating various types of machine tools is used, workpieces can be subjected to almost any type of cutting at only one machining center, and the machining center can operate for 24 hours per day. Thus, such a machining center is used in automated and unmanned factories. Various types of lathe turning machines, milling machines, grinding machines, and the like are also used in automated and unmanned factories.

These machine tools require large quantities of cutting oils. Therefore, at least two filtration apparatuses of the type mentioned above, one of which incorporates a filtration drum having a filtration filter of a large mesh size and the other of which incorporates a filtration drum having a filtration filter of a small mesh size, may be installed, and cutting oils for different applications may be obtained by filtration and reused, thereby economizing on running costs.

However, it is uneconomical to install at least two filtration apparatuses, one of which incorporates a filtration drum having a filtration filter of a large mesh size and the other of which incorporates a filtration drum having a filtration filter of a small mesh size, in an automated factory as described above. Also, this requires an additional installation area.

If these filtration apparatuses are disposed independently of various types of machine tools, automation cannot be obtained. Pipes for sending out the cutting oils must be provided between the filtration apparatuses and the various types of machine tools. However, if two or more filtration apparatuses are installed as described above, the piping becomes complicated.

Regarding a conveying unit that recovers used cutting oil and conveys it to the filtration apparatus, if two or more filtration apparatuses are installed, the conveying line of the conveying unit becomes complicated.

As described above, although it is important in an automated factory and the like to economize by reusing cutting oils obtained by filtration for different applications, installation of two or more filtration apparatuses which occupy a large area, compared to the machine tools is not desirable, and requires a higher facility cost, thus making it uneconomical.

SUMMARY OF THE INVENTION

The present invention has been made in view of the above situations, and has as its object to provide a fractional filtration method and a fractional filtration apparatus which, when machine facilities constituted by various types of industrial machines and a filtration unit are installed, can fractionally filtrate a filtration liquid to be filtered by using different filtering means, can simplify pipings used for sending out the filtration liquid, and can simplify a conveying unit used for recovering the used filtration liquid and conveying it to the filtration unit.

In addition to the above object, it is another object of the present invention to provide a fractional filtration method and a fractional filtration apparatus which can obtain different qualities of cleaned cutting oils fractionally cleaned to be used in accordance with the types of machining operations by using one filtration unit.

It is still another object of the present invention to provide a fractional filtration apparatus in which the drive force of the filtration drum can be decreased to prevent the filtration drum from being set in an overloaded state, thereby enabling a continuous operation.

It is still another object of the present invention to provide a fractional filtration apparatus which can be obtained by one filtration unit occupying a small area.

In order to solve the above problems and to achieve the above objects, according to the present invention there is provided a fractional filtration method of fractionally filtering predetermined solid matter from a soiled or turbid liquid in which the predetermined solid matter and a predetermined liquid mix exist after the liquid is used by industrial machines. The fractional filtration is performed in accordance with the particle size of the predetermined solid matter, thereby enabling re-use of the liquid. The method comprises: preparing a fractional filtration apparatus including a plurality of liquid tanks for fractionally storing liquids, a storage tank for temporarily storing the turbid liquid, rotatably driven filtration drums rotatably supported in the storage tank, each drum having a side-surface opening in at least one surface thereof in order to let a fractionally filtered liquid flow into a corresponding one of the liquid tanks and each drum being provided with filtering means of different mesh size, and at least corresponding in number to the liquid tanks, injecting means for washing the filtering means of the filtration drums, and dip-up means for continuously conveying the solid matter and causing the solid matter to drop through a discharge port; preparing supply means arranged between the liquid tanks and the industrial machines for supplying the liquid to the industrial machines; and preparing conveying means disposed between the fractional filtration apparatus and the industrial machines for conveying the turbid liquid to the fractional filtration apparatus.

The fractionally filtered liquids are supplied from the common fractional filtration apparatus to the industrial machines. Thus, desired liquids are fractionally filtered by the filtration drums provided with filtering means of different mesh sizes and stored in the liquid tanks, and are supplied to desired industrial machines through the supply means. The fractional filtration apparatus is shared, and the arrangement of the supply means or the conveying means is simplified.

Preferably, according to the present invention, there is provided a fractional filtration method of fractionally filtering a solid matter, in accordance with the particle size of the solid matter, from a turbid liquid, in which the solid matter generated by cutting or grinding and a liquid material mix exist after the liquid is used by machine tools, thereby enabling re-use of the liquid material. The method comprises: preparing a fractional filtration apparatus including a plurality of liquid tanks for fractionally storing liquid materials, a storage tank for temporarily storing the turbid liquid, rotatably driven filtration drums, rotatably supported in the storage tank, each drum having a side-surface opening in at least one surface thereof in order to let a fractionally filtered liquid material flow into a corresponding one of the liquid tanks and each drum being provided with filtering means of different mesh sizes, and at least corresponding in number to the liquid tanks, injecting means for washing the filtering means provided on the outer circumferential surfaces of the filtration drums, and dip-up means for continuously conveying the solid matter and causing the solid matter to drop through a discharge port; preparing supply means, arranged between the liquid tanks and the machine tools, for supplying the liquid material to the machine tools; and preparing conveying means, disposed between the fractional filtration apparatus and the machine tools, for conveying the turbid liquid to the fractional filtration apparatus. The fractionally filtered liquid materials are supplied from the common fractional filtration apparatus to the machine tools.

Thus, desired liquid materials are fractionally filtered by the filtration drums provided with filtering means of different mesh sizes and stored in the liquid tanks, and are supplied to a desired machine tool through the supply means. The fractional filtration apparatus can be shared, and the arrangement of the supply means or the conveying means is simplified.

Preferably, according to the present invention, there is provided a fractional filtration apparatus for fractionally filtering predetermined solid matter, in accordance with the particle size of the predetermined solid matter, from a turbid liquid, in which the predetermined solid matter and a predetermined liquid mixedly exist after the liquid is used by industrial machines, thereby enabling re-use of the liquid. The apparatus comprises: a plurality of liquid tanks for fractionally storing liquids; a storage tank for temporarily storing the turbid liquid; rotatably driven filtration drums, rotatably supported in the storage tank, each drum having a side-surface opening in at least one surface thereof in order to let a fractionally filtered liquid flow into a corresponding one of the liquid tanks, and each drum being provided with filtering means of different mesh sizes, and at least corresponding in number to the liquid tanks; injecting means for washing the filtering means provided on the outer circumferential surfaces of the filtration drums; and dip-up means for continuously conveying the solid matter downward from a charge port of the turbid liquid and causing the solid matter to drop through a discharge port. Desired liquids can be fractionally filtered by the filtration drums provided with filtering means of different mesh sizes and stored in the oil tanks. Thus, the filtration apparatus can be shared.

More preferably, according to the present invention, there is provided a fractional filtration apparatus for fractionally filtering a solid matter from a turbid liquid, in which the solid matter generated by cutting or grinding and a liquid material mixedly exist after the liquid is used by tool machines. The fractional filtration is performed in accordance with the particle size of the solid matter, thereby enabling re-use of the liquid. The apparatus comprises: a plurality of liquid tanks for fractionally storing liquid materials; a storage tank for temporarily storing the turbid liquid; rotatably driven filtration drums, rotatably supported in the storage tank, each having a side-surface opening in at least one surface thereof in order to let the filtered liquid material to flow into a corresponding one of the liquid tanks, and each drum being provided with filtering means of different mesh sizes, and at least corresponding in number to the liquid tanks; injecting means for washing the filtering means provided on the outer circumferential surfaces of the filtration drums; and dip-up means for continuously conveying the solid matter downward from a charge port of the turbid liquid and causing the solid matter to drop through a discharge port. Desired liquid materials are cleaned by the filtration drums provided with filtering means of different mesh sizes, and stored in the oil tanks. Thus, the liquid materials to be separately used in accordance with the types of machining operations can be obtained through fractional filtration by using one filtration apparatus.

Preferably, the apparatus further comprises a seal member for sealing a liquid level of the liquid or liquid material from two side surface portions of the storage tank, thus dividing the liquid level into an upstream side and a downstream side, and for enabling the filtration drums to be rotatable in the filtration tank. Thus, rotation of the filtration drums is facilitated.

Preferably, the filtration drums are rotatably supported in the storage tank in order to divide a liquid level of the liquid or liquid material with no gap with respect to side plates of the storage tank, and floating solid matter settling-out means for causing cuttings floating on the liquid level to settle out are fixedly provided on outer circumferential surfaces of the filtration drums. As the floating cuttings settling-out means are fixedly provided on the outer circumferential surfaces of the filtration drums, the liquid materials to be separately used in accordance with the types of cutting operations can be obtained through fractional filtration by using one filtration apparatus. Since the filtration drums are pivotal in the floating state, the drive force for the filtration drums can be decreased, and the filtration drums are provided with no gap, so that cuttings will be prevented from entering the gap. The filtration drums are prevented from being set in an overload state.

Preferably, the dip-up means comprises: a sprocket and a guide member disposed in the storage tank to share a drive source with drive means that drives the filtration drums; drum sprockets fixed to the filtration drums; endless chains meshing with the sprocket and the drum sprockets, to be guided by the guide member; and one drive motor for driving the sprocket, so that the drive system is simplified.

Preferably, according to the present invention, there is provided a fractional filtration apparatus for fractionally filtering a solid matter from a turbid liquid, in which solid matter generated by cutting or grinding and a liquid material mixedly exist after the liquid is used by industrial machines, thereby enabling re-use of the liquid material. The apparatus comprises a plurality of liquid tanks for fractionally storing liquid materials; a storage tank for temporarily storing the turbid liquid; a fractional filtration drum, rotatably supported in the storage tank and having side-surface openings in two surfaces thereof in order to let a filtered liquid material flow into a corresponding one of the liquid tanks, and comprising a partition wall so that filtering means of different mesh sizes are provided in a longitudinal direction thereof; injecting means for reversely washing the filtering means from the inner side of the fractional filtration drum; and dip-up means for continuously conveying the solid matter downward from a charge port of the turbid liquid and causing the solid matter to drop through a discharge port. Thus, fractional filtration can be performed with only one filtration drum.

Preferably, another filtration drum is disposed on the upstream or downstream side of the fractional filtration drum, so that two or more levels of cleaned cutting oils can be obtained.

It should be noted that the present invention is not limited to the embodiments to be described below, and that various arrangements are possible within the scope of the appended claims.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

Figure 1:
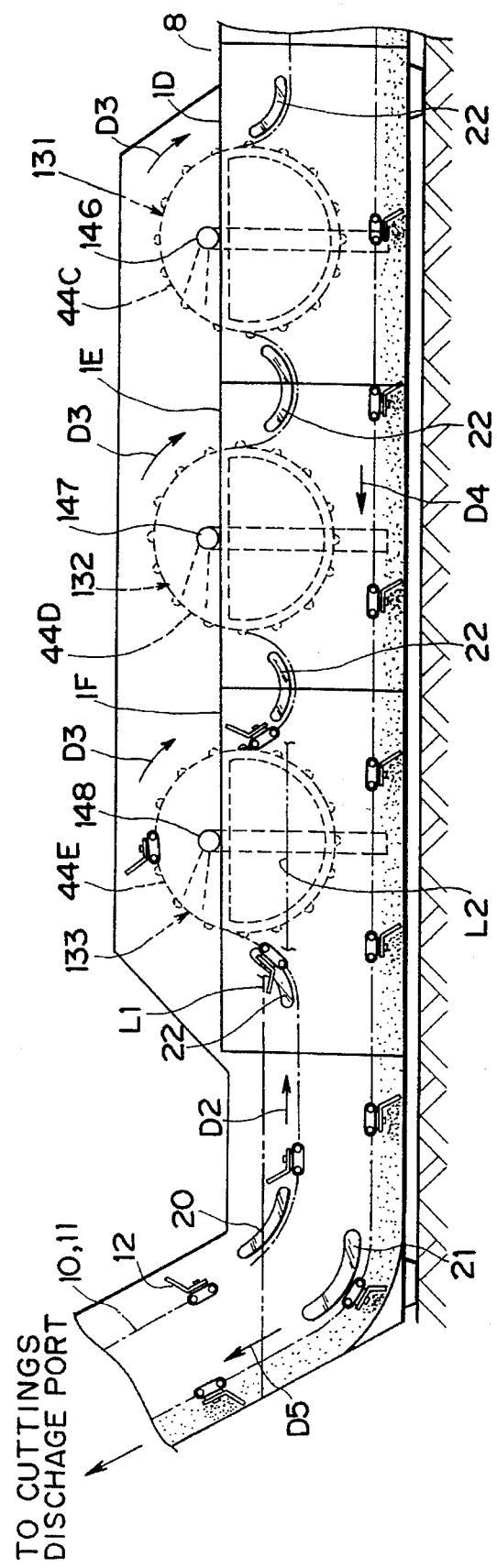
FIG. 1 is a side view showing the arrangement of the main part of a fractional filtration apparatus according to the first embodiment.

The preferred embodiments of the present invention will be described with reference to the accompanying drawings. FIG. 1 is a side view showing the main part of a fractional filtration apparatus according to the first embodiment of the present invention.

FIG. 1 shows the schematic arrangement of the fractional filtration apparatus which fractionally obtains cleaned cutting oils by filtering cuttings from a filtration target cutting oil containing cuttings having different particle sizes, that are generated by cutting in a machine tool. This schematic arrangement is not limited to a machine tool but can similarly be applied to a food processing machine which separates oils and fats from solid matters, and civil engineering machines which obtain, by fractional filtration, earth and sand in accordance with the particle sizes from a solid or turbid liquid mixedly containing earth and rocks.

Referring to FIG. 1, in a fractional filtration apparatus 1, a plurality of clean tanks 1D, 1E, and 1F for fractionally storing cleaned cutting oils are continuously provided from an upstream charge port 8 to a downstream cuttings discharge port.

In a storage tank for temporarily storing a filtration target cutting oil, filtration drums 131, 132, and 133 for halving a liquid level L1 (indicated by a chain double-dashed line) of the filtration target cutting oil are provided from the upstream charge port 8 to the downstream cuttings discharge port. The opening portion of each filtration drum is located on the upstream side of the corresponding one of the clean tanks 1D, 1E, and 1F, so that the cleaned cutting oils filtered by the respective filtration drums flow into the corresponding clean tanks.

Filtration filters 44C, 44D, and 44E of different mesh sizes (e.g., filtration capabilities of 100, 50, and 20 microns) having higher filtration capabilities toward the downstream direction are replaceably fixed on the outer circumferential surfaces of the filtration drums 131, 132, and 133, respectively.

Blow-off pipes 146, 147, and 148 are provided in the filtration drums 131, 132, and 133, respectively, to wash the corresponding filtration filters 44C, 44D, and 44E from the inner sides (the side where the cleaned cutting oil flows) in the reverse direction. When the cleaned cutting oils stored in the clean tanks 1D, 1E, and 1F are forcibly injected from the inner sides of the filtration drums through pumps (not shown), the cuttings remaining on the filtration filter surfaces are blown off, thereby effectively preventing clogging of the filtration filters.

A large number of dip-up plates 12 are provided between right and left endless chains 10 and 11 (indicated by a chain line in FIG. 1) at a predetermined interval by fixing metal members from the upstream the charge port 8 side to the downstream cuttings discharge port side to continuously convey the cuttings toward the discharge port. These right and left chains 10 and 11 are driven by a motor (not shown) to move in a direction indicated by an arrow D2 in FIG. 1, and are guided to mesh with drum sprockets (to be described later), as shown in FIG. 1, by corresponding drum chain guides 22, provided to the respective filtration drums 131, 132, and 133, at their intermediate portions. After meshing, the respective chains are switched by 180° through sprockets (not shown) disposed on the upstream side of the apparatus and directed in a direction of an arrow D4 in FIG. 1 to convey the cuttings that have been settled out in the filtration target cutting oil to the downstream side. Then, the respective chains are moved upward along the inclined portion in FIG. 1 in a direction indicated by an arrow D5, thereby conveying the cuttings toward the cuttings discharge port.

Through the above series of operations, cleaned cutting oils cleaned in accordance with the filtration capabilities of the filtration filters 44C, 44D, and 44E are stored in the clean tanks 1D, 1E, and 1F, respectively. The various qualities of cleaned cutting oils obtained in this manner are separately used as required for precision cutting, heavy cutting, rough cutting, and the like.

As the result of the above operations, separate cleaned cutting oils for different applications can be fractionally obtained by installing, e.g., one fractional filtration apparatus, in a machinery factory. Therefore, it is highly economical in a machine cutting factory and the like where a large amount of cutting oil is used.

Figure 2:
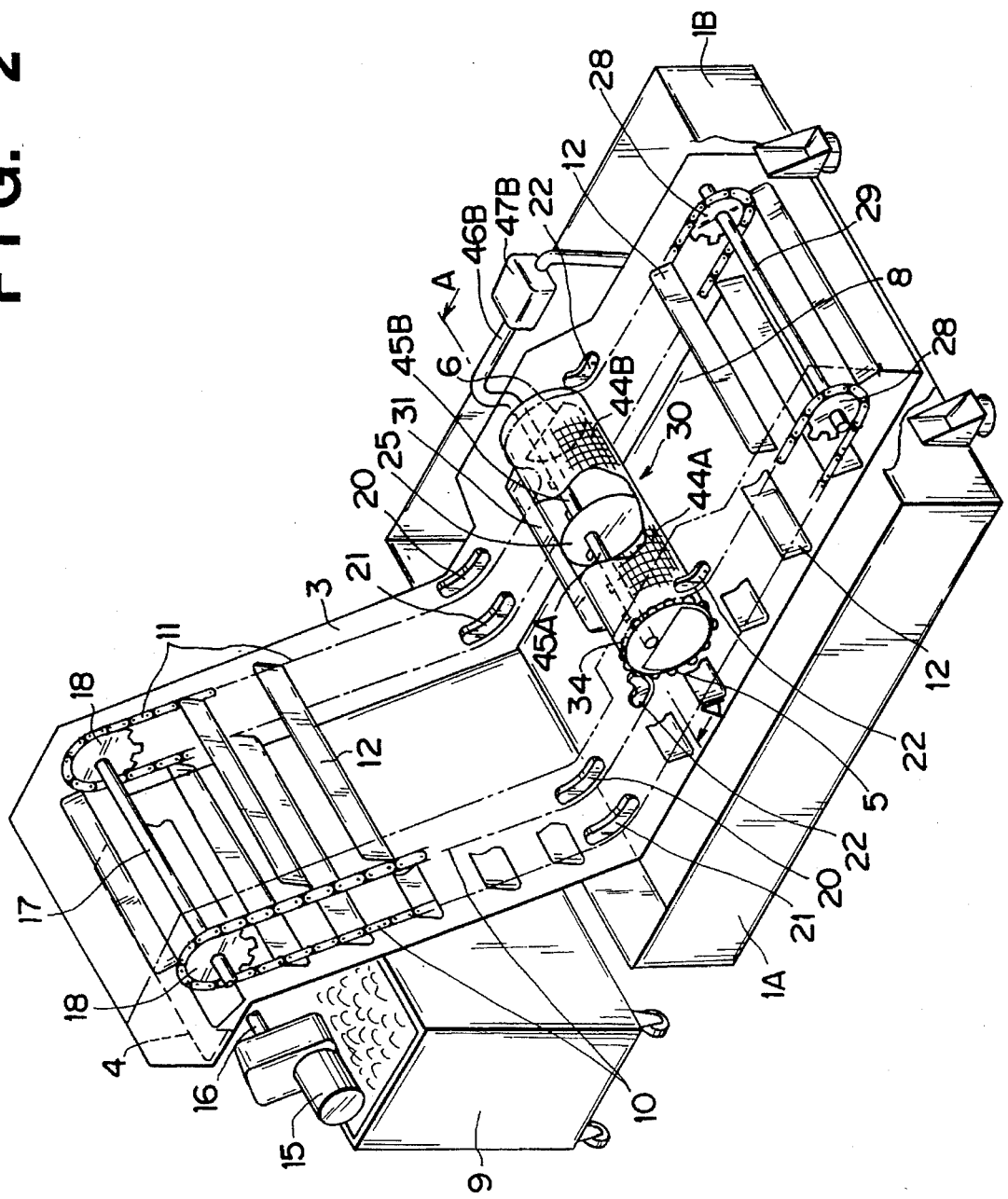
FIG. 2 is a perspective view showing the outer appearance of a fractional filtration apparatus according to the second embodiment, from which a cover and the like are removed to show the internal arrangement of the main part.

FIG. 2 is a perspective view showing the outer appearance of a fractional filtration apparatus according to a second embodiment, from which a cover and the like are removed to show the internal arrangement of the main part. Referring to FIG. 2, a clean tank serving as the base portion of the entire apparatus is divided into a left clean tank 1A and a right clean tank 1B. The installation leg portions are fixed to the four corners of the clean tank, so that the clean tank can be fixedly installed on the floor surface in the factory with horizontal adjustment. These clean tanks 1A and 1B store cleaned cutting oils that are fractionally filtered in a manner to be described later.

A filtration target cutting oil storage unit, a bottom surface of which is partly shared by the clean tank, is arranged between the clean tanks 1A and 1B to store the filtration target cutting oil. For this reason, a left side plate 2 and a right side plate 3 (part of which is indicated by a chain double-dashed line) are fixed by welding to continue to the bottom surface and the front wall surface of the clean tank in a liquid-tight state. The respective constituent elements to be described below are mounted on the right and left side plates 2 and 3.

The right and left side plates 2 and 3 are provided such that the rear side of the apparatus corresponds to the downstream side and that the front side in the drawing corresponds to the upstream side, as shown in FIG. 2. The downstream portions of the right and left side plates 2 and 3 extend obliquely upward, as shown in FIG. 2, and form a cuttings discharge port 4 (indicated by a broken line) between them at the uppermost portion. The cuttings are dropped into a cuttings recovery box 9 which is placed below the cuttings discharge port 4.

The most upstream portions of the right and left side plates 2 and 3 are shared by the side walls of the respective clean tanks 1A and 1B and form an opening or charge port 8, which is open upward, on the upstream side (the front side of the apparatus) of a filtration drum 30 which is pivotally held in a floating manner (to be described later) between the right and left side plates 2 and 3. The filtration target cutting oil can be charged into the filtration target cutting oil storage unit as required through the opening 8.

Bearings (not shown) are disposed at the obliquely upper portions of the right and left side plates 2 and 3 on the downstream side to rotatably, axially support a sprocket shaft 17 on which a pair of upper right and left sprockets 18 are fixed. The sprocket shaft 17 is coupled to an output shaft 16 of a drive motor 15 which is fixed to the left side plate 2 and integrally provided with a reduction gear. When the drive motor 15 is driven, the upper sprockets 18 can be continuously driven clockwise.

Bearings (not shown) are similarly disposed to the front portions of the right and left side plates 2 and 3 on the most upstream side to rotatably, axially support a sprocket shaft 29 on which a pair of lower right and left sprockets 28 are fixed.

Right and left endless chains 10 and 11, part of which are indicated by a chain line in FIG. 2, are mounted between the upper and lower sprockets 18 and 28 provided in the above manner to mesh with them. The right and left chains 10 and 11 are guided substantially along the right and left side plates 2 and 3, as shown in FIG. 2. Midway along the travel path of chains 10 and 11, upper chain guides 20 and lower chain guides 21 are fixed at chain direction switch portions on the opposing surfaces of the right and left side plates 2 and 3. Drum chain guides 22 are also fixed on the opposing surfaces of the right and left side plates 2 and 3 on the upstream and downstream sides of the filtration drum 30, so that the chain 10 rotates the filtration drum 30.

A predetermined number of dip-up plates 12 are fixed between the left chain 10 and the right chain 11 at predetermined intervals to continuously convey the cuttings that have been settled out in the filtration target cutting oil to the downstream side. Thus, the cuttings are conveyed to the downstream side and discharged. While the cuttings in the filtration target cutting oil are transported a sufficiently long distance to the upstream side of the cuttings discharge port 4, the cutting oil is sufficiently removed from the cuttings.

A drum sprocket 34 is fixed on the outer circumferential surface of the filtration drum 30. A pivoting force is supplied from the left chain 10 meshing with the drum sprocket 34, thereby constantly pivoting the filtration drum 30 clockwise.

Filtration filters 44A and 44B, which are made of a stainless steel metal mesh, a chemical fiber mesh, a wedge wire, a punching metal plate, or the like and which have different filtration capabilities of 20 microns and 100 microns, are replaceably wound and fixed on the outer circumferential surface of the filtration drum 30 with a partition wall 25 between them as their boundary. After the filtration target cutting oil is fractionally filtered by being passed through the filtration filters 44A and 44B, thus obtaining cleaned cutting oils, the cleaned cutting oils flow into the respective clean tanks 1A and 1B of the clean tank 1 through a semicircular opening 5 formed in the left side plate 2 and a semicircular opening 6 (indicated by a broken line) formed in the right side plate 3.

In order to inject the cleaned cutting oils in the respective clean tanks 1A and 1B toward the filtration filters 44A and 44B, injection pipes 45A and 45B, respectively, connected to pipes 46A (not shown) and 46B and pumps 47A (not shown) and 47B, are disposed in the filtration drum 30 as they are cantilevered at the semicircular openings 5 and 6. The filtration filters 44A and 44B are washed in a so-called reverse direction through the nozzles of the respective injection pipes 45A and 45B, so that clogging of the filtration filters 44A and 44B is eliminated, thereby enabling continuous filtration.

A floating cuttings dip-up plate 31 is fixed on the outer circumferential surface of the filtration drum 30. The dip-up plate 31 is used for causing the floating cuttings, which float on the oil surface as they obtain buoyancy in the filtration target cutting oil, to settle out in the filtration target cutting oil. As the filtration drum 30 is pivoted clockwise, the dip-up plate 31 causes the floating cuttings to settle out in the filtration target cutting oil to prevent the floating cuttings from accumulating. Thus, the filtration filters 44A and 44B will not become clogged be damaged.

The fractional filtration apparatus described above can be made at a low cost since both the dip-up plates 12 provided at the predetermined intervals and the filtration drum 30, both of which are provided between the right and left chains 10 and 11, can be driven by the drive force of one drive motor 15 serving as a common drive source. Since the charge port 8 of the filtration target cutting oil can be set at a low position, the charging operation becomes easy. Since the cuttings can be dropped through the cuttings discharge port 4 into the cuttings recovery box 9 having a comparatively large height from the portion above it, a rational layout can be realized.

Figure 3:
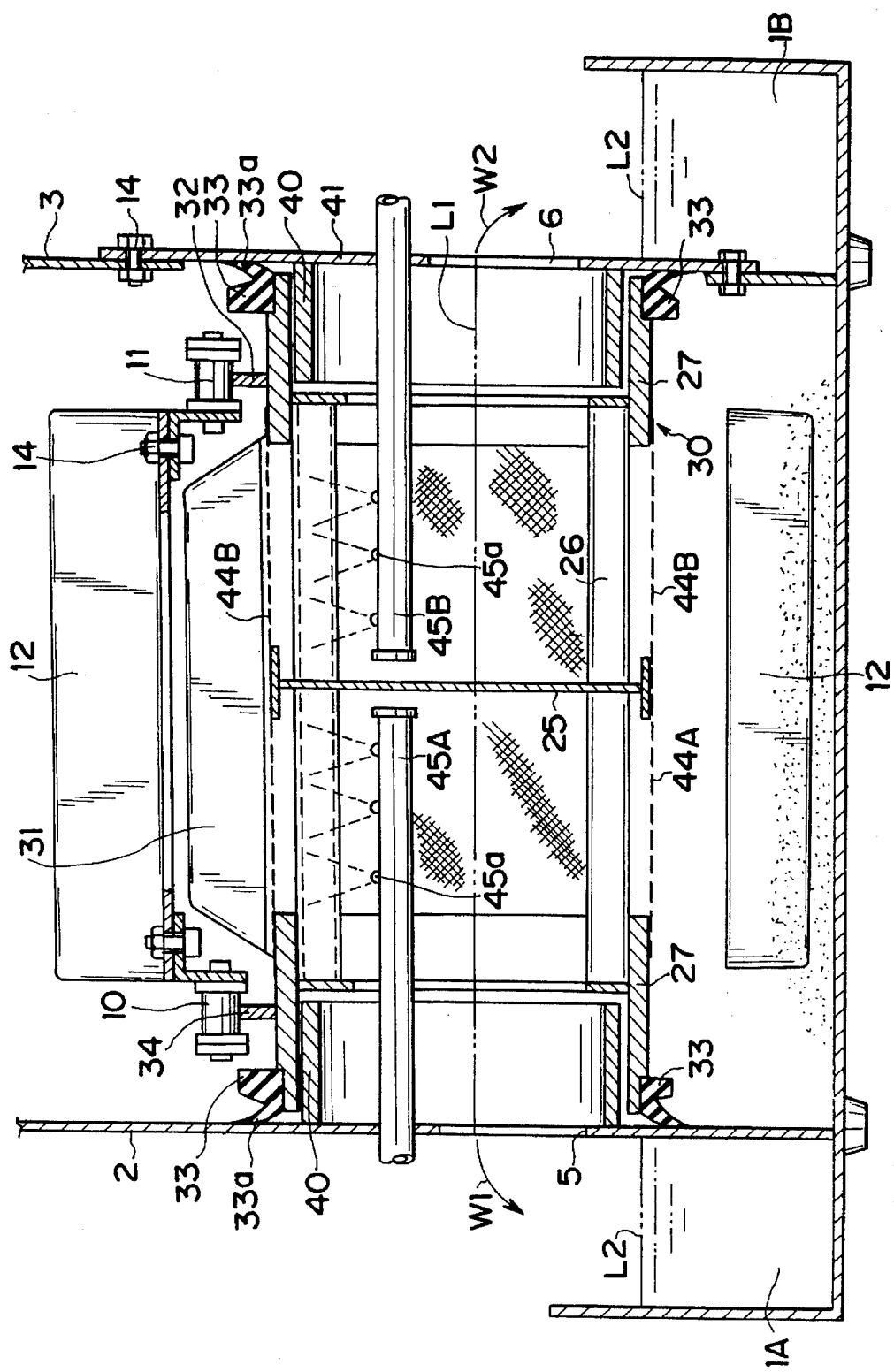
FIG. 3 is a sectional view taken along the line A—A of FIG. 2.
Figure 4:
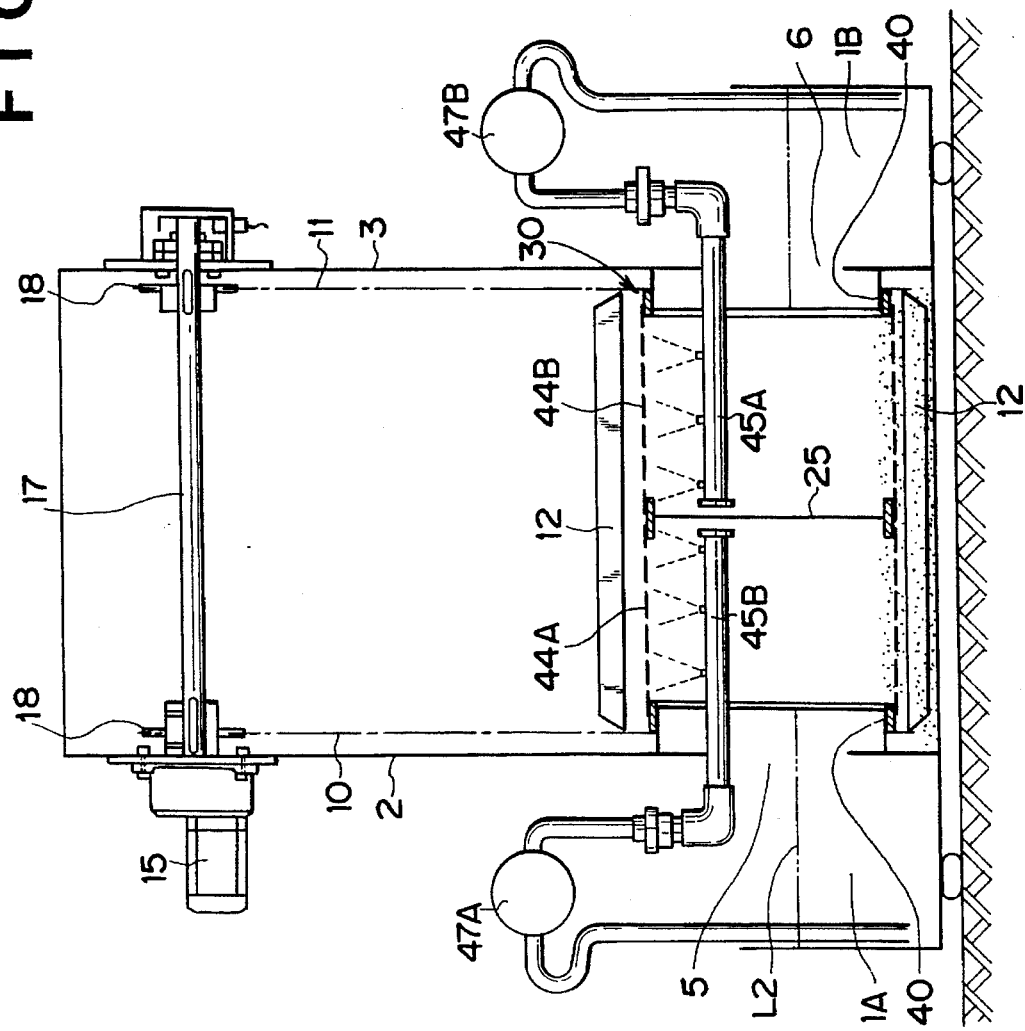
FIG. 4 is a right side view of FIG. 2.

FIG. 3 is a sectional view taken along the line A—A of FIG. 2. FIG. 4 is a side view of the fractional filtration apparatus shown in FIG. 2 when viewed from the upstream side toward the downstream side. Referring to FIGS. 3 and 4, portions which have already been described in FIG. 2 will be denoted by the same reference numerals, and a repetitive explanation will be omitted. The supported state of the filtration drum 30 will be mainly described. An annular guide member 40 extending beside the filtration target cutting oil storage unit is fixed in the vicinity of the semicircular opening 5 of the left side plate 2 by welding or the like.

A mounting plate 41, in which the semicircular opening 6 is formed and on which the injection pipe 45B is fixed, is fixed to the right side plate 3 by using a plurality of bolts and nuts 14. Another annular guide member 40, beside the filtration target cutting oil tank, is similarly fixed to this mounting plate 41 by welding or the like. Thus, the filtration drum 30 which is constituted as a separate component can be set in the assembled state indicated in the drawings.

A plurality of pipe members 26 are integrally welded between right and left annular base portions 27, thereby forming the filtration drum 30 to have a predetermined width. The drum sprocket 34 and a guide portion 32 are fixed to the outer surfaces of the base portions 27 to mesh with and guide the right and left chains 10 and 11. Alternatively, the filtration drum 30 may be made by using plate members. Openings may be formed in the plate members, and the respective filtration filters may be provided to the openings.

The dip-up plate 31 is fixed to the base portions 27 by using bolts and nuts 14. Similarly, the filtration filters 44A and 44B are wound on and fixed to the base portions 27 as they are kept taut on them.

The guide members 40 are inserted in and supported by the base portions 27 of the filtration drum 30 having the above arrangement in a loosely fitted state. Seal members 33 made of, e.g., rubber members called V seals or plate-like rubber seals, are fixed to the edge portions of the respective base; portions 27 of the filtration drum 30. Seal portions 33a of the seal members 33 are in tight contact with the right and left side plates 2 and 3 and the wall surface of the mounting plate 41. Alternatively, the V seals may be fixed to the right and left side plates 2 and 3 and the mounting plate 41.

When the filtration drum 30 is formed and supported in the above manner, it constantly floats as the liquid level L1 of the filtration target cutting oil rises, and its clockwise pivot can be decreased. By the operation of the dip-up plate 31, the floating cuttings can be settled out in the filtration target cutting oil. Thus, the floating cuttings will be prevented from accumulating, thereby effectively preventing the filtration filters 44A and 44B from becoming clogged and being damaged.

Since the filtration drum 30 is pivotally provided between the right and left side plates 2 and 3 with no gap by using the seal members 33, the floating cuttings are completely prevented from entering the downstream side of the filtration drum 30.

Figure 5:
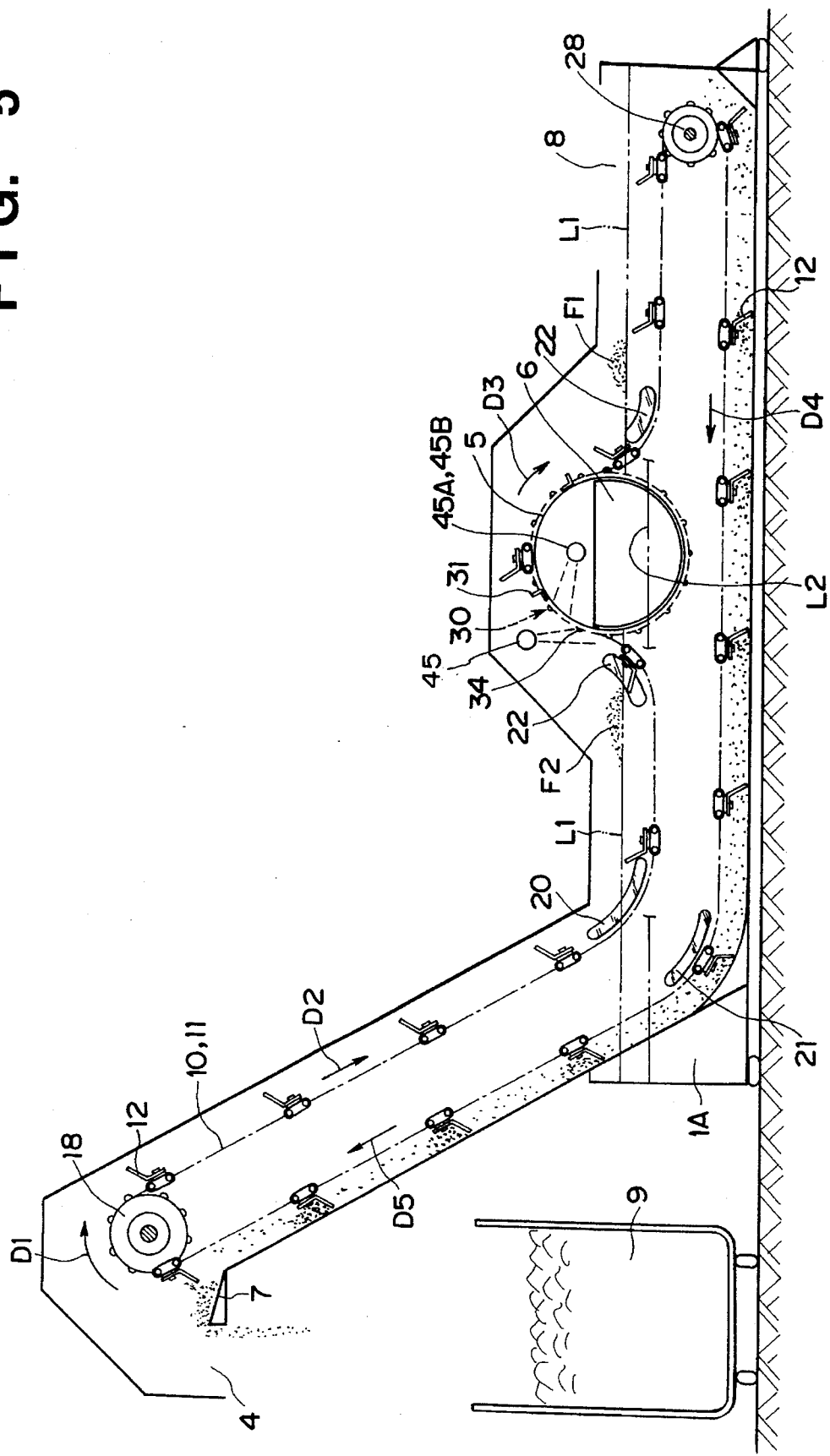
FIG. 5 is a side view for explaining the operation of the second embodiment.

FIG. 5 is a side view of the arrangement of the main part of the fractional filtration apparatus described above, and shows the operation of the same. Referring to FIG. 5, the constituent elements that have not been described yet will be described. A plate 7, inclined as shown in FIG. 5, is provided in the vicinity of the cuttings discharge port 4 to finally remove the cutting oil from the cuttings.

The operation of the fractional filtration apparatus will be described with reference to FIG. 5. The filtration target cutting oil is charged from the charge port 8, and the filtration drum 30 is set in the floating state. Consecutively, when a switch (not shown) is turned on, the upper sprockets 18 start to pivot in a direction indicated by an arrow D1 in FIG. 5. Thus, the right and left chains 10 and 11 are also moved in a direction indicated by an arrow D2, are switched by the upper chain guides 20 in substantially the horizontal direction, and are guided by the drum chain guides 22 to mesh with the drum sprocket 34 and to move along the outer circumferential surface of the filtration drum 30, respectively, thereby driving the filtration drum 30 in a direction of an arrow D3 in FIG. 5. The right and left chains 10 and 11 are then switched by 180° by the lower sprockets 28 to move downstream in a direction indicated by an arrow D4, and are guided by the lower chain guides 21 to move in the upper left direction indicated by an arrow D5.

Before or after the series of operations, the pumps 47A and 47B are started to forcibly spray the cleaned cutting oils from the injection pipes 45A and 45B toward the filtration filters 44A and 44B, thereby performing reverse washing. Alternatively, the filtration drum 30 can be washed from its outer side by forcibly spraying the cleaned cutting oils from injection pipe 45, shown in dashed lines in FIG. 6.

When a predetermined period of time has elapsed after the above operation, the cleaned cutting oils are stored in the clean tanks 1A and 1B up to a liquid level L2. During the series of operations, cuttings F1 and F2 floating on the liquid level L1 of the filtration target cutting oil are completely separated into upstream side floating cuttings F1 floating on the charge port 8 side of the filtration target cutting oil and downstream side floating cuttings F2 by the filtration drum 30. Thus, the floating cuttings F1 are completely prevented from being mixed with the floating cuttings F2 which float on the downstream side of the filtration drum 30. The floating cuttings F1 and F2 are settled out in the filtration target cutting oil by the operation of the dip-up plate 31. Thus, the floating cuttings are prevented from accumulating, thereby preventing the filtration filters 44A and 44B from becoming clogged and being damaged.

Since the filtration drum 30 is rotated such that the seal portions 33a of the seal members 33 are in tight contact with the right and left side plates 2 and 3 and the wall surface of the mounting plate 41, an overload will not be generated and a continuous operation is enabled. When a belt conveyor for continuously supplying the filtration target cutting oil is combined with the recovery box for continuously conveying out the cuttings, an unmanned continuous operation can be performed.

As described above, according to the fractional filtration apparatus having the arrangement of the second embodiment, cleaned cutting oils cleaned in accordance with the filtration performances of the filtration filters 44A and 44B are stored in the respective clean tanks 1A and 1B, respectively. The various qualities of cleaned cutting oils obtained in this manner are separately used as required for precision cutting, heavy cutting, rough Cutting, and the like. In particular, since the common filtration drum 30 is divided by the partition wall 25, the fractional filtration apparatus can be made small in the longitudinal direction.

Figure 6:
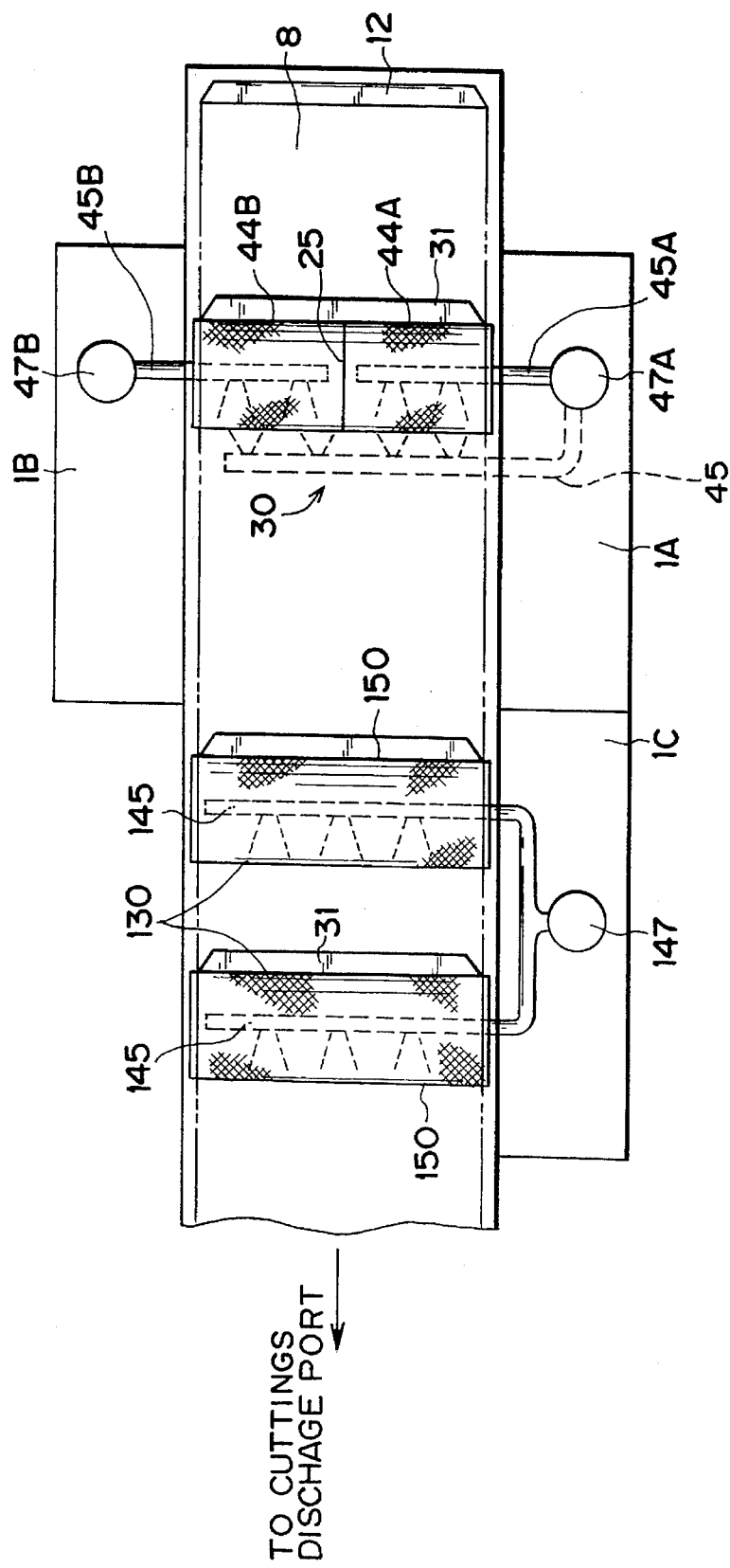
FIG. 6 is a plan view of a fractional filtration apparatus according to the third embodiment.

The third embodiment of the present invention will be described with reference to the plan view of FIG. 6. Referring to FIG. 6, portions identical to those described above will be denoted by the same reference numerals, and a repetitive description will be omitted. Only characteristic portions different from those of the above embodiments will be described. A pair of second filtration drums 130 are provided on the downstream side of a filtration drum 30 as shown in FIG. 6. Second injection pipes 145 are provided in the second filtration drums 130 to supply cleaned cutting oil from a pump 147 into the second filtration drums 130, thereby washing filtration filters 150 provided on the outer circumferential surfaces of the second filtration drums 130 in the reverse direction.

According to the fractional filtration apparatus having the above arrangement, two different types of cleaned target cutting oils can be cleaned by the filtration drum 30 on the upstream side and stored in clean tanks 1A and 1B, and a cleaned cutting oil cleaned by the second filtration drums 130 on the downstream side is stored in a clean tank 1C. With this arrangement, the cleaning action is enhanced by the existence of the two additional second filtration drums 130, so that the convey speed of the right and left chains can be doubled, in addition to the operations and effects described above. Even if one filtration drum causes clogging, a marginally satisfactory cleaning action can be expected.

Although not shown, if a third filtration drum is further provided, a more effective cleaning action can be realized.

The present invention is not limited to the arrangements described above, and various design modifications can be made as required. For example, regarding right and left side plates 2 and 3 occupying comparatively large areas, a clean tank 1, and the like, only their outer frames may be formed in advance, and iron plates having predetermined thicknesses may be welded as required, thereby forming the right and left side plates 2 and 3, the clean tank 1, and the like. A filtration drum 30 may be formed by fixing a filtration filter on a cylindrical integral body. The injecting directions of the respective injection pipes are not limited those shown in FIG. 3 but can be changed as required. When the cuttings are limited to iron cuttings, settling-out of the cuttings can be promoted by disposing a permanent magnet on the bottom surface of the filtration target cutting oil storage unit.

According to the fractional filtration apparatus described above, cleaned cutting oils fractionally cleaned to be separately used in accordance with the types of cutting operations can be obtained by using one filtration apparatus.

A fractional filtration apparatus can be provided in which the drive force of the filtration drum can be decreased and the filtration drum will not be set in an overload state, thereby enabling a continuous operation.

Cleaned cutting oils of varying qualities which are separately used in accordance with the types of cutting operations and applications, e.g., washing-out of the cuttings deposited in an automated factory or a machining center, can be obtained through fractional cleaning by using one filtration apparatus occupying a small area.

Figure 7:
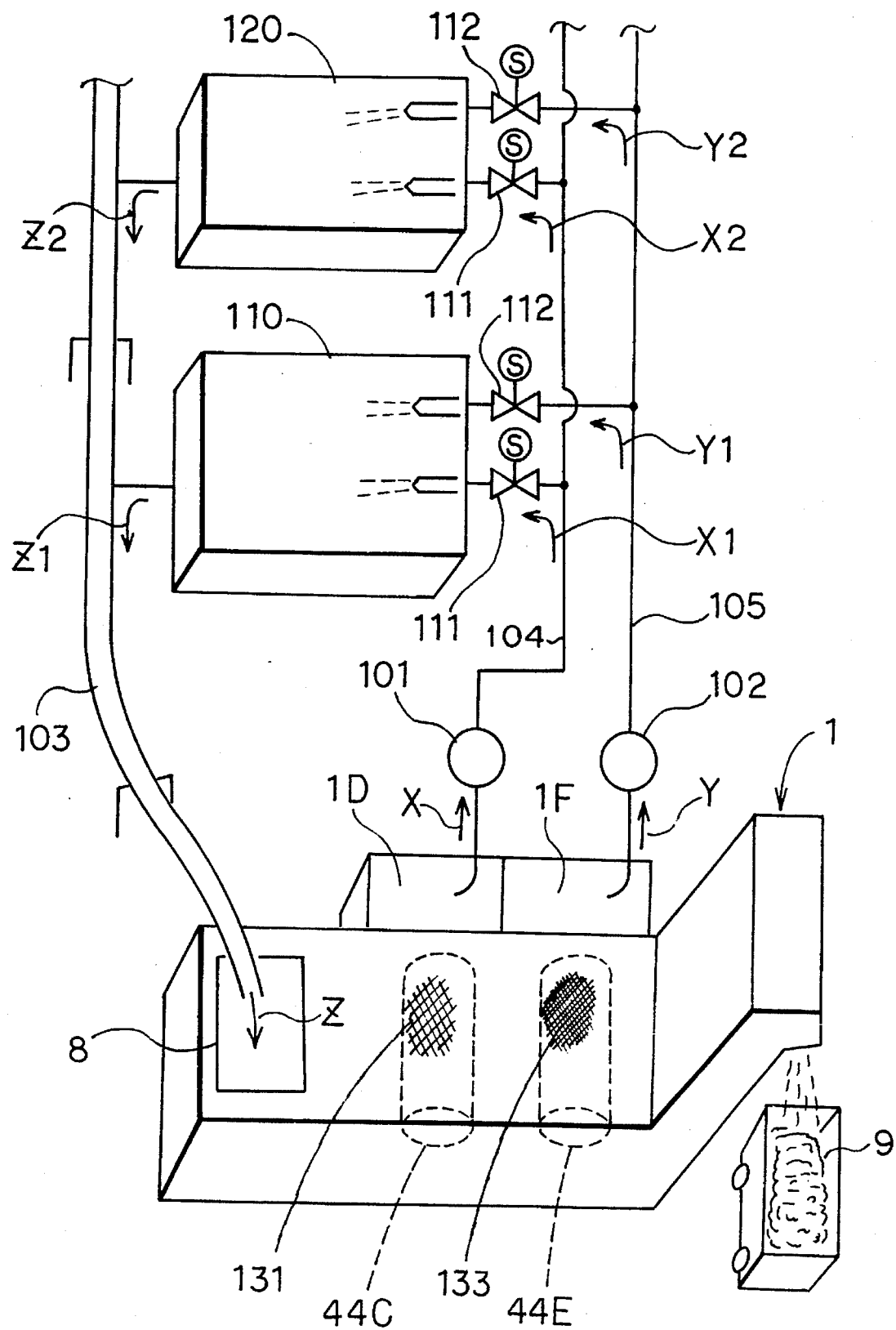
FIG. 7 is a view showing the layout of a fractional filtration apparatus and machine tools.

Finally, FIG. 7 is a view showing the layout of a fractional filtration apparatus 1 and machine tools 110, 120, . . . . FIG. 7 shows the schematic arrangement of the fractional filtration apparatus 1 which fractionally obtains cleaned cutting oils by filtering cuttings from a filtration target cutting oil mixedly containing cuttings having different shapes, sizes, and particle sizes, that are generated after machining, e.g., cutting or grinding, by the machine tools 110, 120, . . . , and a cutting oil. This schematic arrangement is not limited to the indicated machine tools, as described above, but can similarly be applied to a food processing machine which separates fats and oils from solid matters, and a civil engineering machine which obtains, by fractional filtration, earth and sand in accordance with the particle sizes from a turbid liquid mixedly containing earth and rocks.

Referring to FIG. 7, in the fractional filtration apparatus 1, a plurality of clean tanks 1D and 1F for fractionally storing cleaned cutting oils are continuously provided from an upstream charge port 8 to a downstream cuttings discharge port. In a storage tank for temporarily storing the filtration target cutting oil, filtration drums 131 and 133 (indicated by broken lines) for dividing the liquid level of the filtration target cutting oil are provided from the upstream charge port 8 to the downstream cuttings discharge port. The opening portions of the filtration drums 131 and 133 are located to oppose the clean tanks 1D and 1F, respectively, so that the cleaned cutting oils filtered by the respective filtration drums are flowed into the corresponding clean tanks.

Filtration filters 44C and 44E of different mesh sizes (e.g., filtration capabilities of 100 and 20 microns) having higher filtration capabilities in the upstream direction are replaceably fixed on the outer circumferential surfaces of the filtration drums 131 and 133, respectively. Blow-off pipes (not shown) are provided in the filtration drums 131 and 133 to wash the filtration filters 44C and 44E from the inner sides (a side where the cleaned cutting oil flows) in the reverse direction. When the cleaned cutting oils stored in the clean tanks 1D and 1F are forcibly injected from the inner sides of the filtration drums through pumps (not shown), the cuttings remaining on the filtration filter surfaces are blown off, thereby effectively preventing clogging of the filtration filters.

A large number of dip-up plates identical to those described with reference to FIG. 2 are provided from the upstream charge port 8 side to the downstream cuttings discharge port side to continuously convey the cuttings. Thus, the cuttings that have been settled out in the filtration target cutting oil are conveyed to the downstream side and are lifted upward along the inclined portion in FIG. 7, so that they are discharged toward the cuttings discharge port. Through the above series of operations, cleaned cutting oils cleaned in accordance with the filtration capabilities of the filtration filters 44C and 44E are stored in the clean tanks 1D and 1F, respectively.

A first pipe 104, along which a first pump 101 is provided midway, is provided between the respective clean tanks 1D and 1F and the machine tools 110, 120, . . . , serving as the machining centers on which various types of cutting tools including a gun drill are mounted. The first pipe 104 can supply the filtered cutting oil as required to the corresponding machine tools in accordance with the control operation of solenoid valves 111. Similarly, a second pipe 105, along which a second pump 102 is provided midway, is provided between the machine tools 110, 120, . . . , and the clean tank 1F. The second pipe 105 can supply the filtered cutting oil as required to the corresponding machine tools in accordance with the control operation of solenoid valves 112. With the above arrangement, cutting oils are supplied to a precision cutting tool, a gun drill, and the like through the second pipe 105 in a direction indicated by an arrow Y1. When a cutting oil is used in heavy cutting or rough cutting or is flowed from above to flow cuttings deposited in, e.g., an unmanned factory, into an oil tank, and thus a completely filtered cleaned cutting oil is not always needed, the cutting oil is automatically supplied through the first pipe 104 in a direction indicated by an arrow X1.

With a machining center, workpieces can be subjected to almost any type of machining with only one machining center, the machining center can operate for 24 hours per day and thus fractionally filtered cutting oil can be automatically supplied. Thus, such a machining center is very significant in automated and unmanned factories.

When the used filtration target cutting oil containing cuttings is charged in a direction indicated by arrow Z1 from drains disposed on the bottom surfaces of the respective machine tools into the charge port 8 through pipes provided with powerful pumps, belt conveyors or a simple gutter-type conveying means 103 having a difference in elevation, a completely automated, unmanned factory can be achieved.

As described above, separate cleaned cutting oils for different applications can be fractionally obtained by installing, e.g., one fractional filtration apparatus, in a machine shop. Therefore, it is highly economical in a machine cutting factory and the like where a large amount of cutting oil is used.

As many apparently widely different embodiments of the present invention can be made without departing from the spirit and scope thereof, it is to be understood that the invention is not limited to the specific embodiments thereof except as defined in the appended claims.

What is claimed is:

1. A fractional filtration method of fractionally filtering a solid, in accordance with a shape or particle size of the solid, from a turbid liquid, in which the solid and a liquid are mixed after the liquid is used by industrial machines, thereby enabling re-use of the liquid, said method comprising:

preparing a fractional filtration apparatus including a plurality of liquid tanks for storing fractionally filtered liquids, a storage tank for temporarily storing the turbid liquid, rotatably driven filtration drums rotatably supported and partially submerged in said storage tank, each drum having a side-surface opening in at least one surface thereof in order to let fractionally filtered liquid flow into a corresponding one of said liquid tanks, each drum being provided with filtering means of a different mesh size on an outer circumferential surface, and said filtration drums at least corresponding in number to said liquid tanks, injecting means for washing said filtering means, and dip-up means for continuously conveying the solid from said storage tank;

preparing supply means, arranged between said liquid tanks and said industrial machines, for supplying the fractionally filtered liquid to said industrial machines; and preparing conveying means, disposed between said fractional filtration apparatus and said industrial machines, for conveying the turbid liquid to said fractional filtration apparatus.

2. The method according to claim 1, wherein said injecting means washes said filtering means reversely from the inner sides to the outer sides of said filtration drums.

3. A fractional filtration method of fractionally filtering a solid, in accordance with a shape or particle size of the solid, from a turbid liquid, in which the solid, generated by cutting or grinding, and a liquid material are mixed after the liquid material is used by industrial machines, thereby enabling re-use of the liquid material, said method comprising:

preparing a fractional filtration apparatus including a plurality of liquid tanks for storing fractionally filtered liquid materials, a storage tank for temporarily storing the turbid liquid, a rotatably driven filtration drum, rotatably supported in said storage tank, said drum having side-surface openings in two surfaces thereof in order to let fractionally filtered liquid material flow into corresponding liquid tanks, and further having a partition wall within said filtration drum and filtering means of different mesh sizes provided on an outer circumferential surface of the filtration drum on either side of said partition wall in a longitudinal direction thereof, injecting means for washing said filtering means, and dip-up means for continuously conveying the solid from the storage tank;

preparing supply means, arranged between said liquid tanks and said industrial machines, for supplying the fractionally filtered liquid material to said machine tools; and preparing conveying means, disposed between said fractional filtration apparatus and said in industrial machines, for conveying the turbid liquid to said fractional filtration apparatus.

4. The method according to claim 3, wherein said injecting means washes said filtering means reversely from the inner sides to the outer sides of said filtration drum.

5. A fractional filtration apparatus for fractionally filtering a predetermined solid, in accordance with a shape or particle size of the predetermined solid, from a turbid liquid, in which the predetermined solid and a liquid are mixed after the liquid is used by industrial machines, thereby enabling re-use of the liquid, said apparatus comprising:

a plurality of liquid tanks for storing fractionally filtered liquids;

a storage tank for temporarily storing the turbid liquid;

rotatably driven filtration drums, rotatably supported and partially submerged in said storage tank, each filtration drum having a side-surface opening in at least one surface thereof in order to let a fractionally filtered liquid flow into a corresponding one of said liquid tanks, each drum being provided with filtering means of a different mesh size on an outer circumferential surface;

injecting means for washing said filtering means; and dip-up means for continuously conveying the solid downward from a charge port of the turbid liquid and causing the solid to drop through a discharge port.

6. The apparatus according to claim 5, wherein said injecting means washes said filtering means reversely from inner sides to outer sides of said filtration drums.

7. The apparatus according to claim 5, further comprising a dynamic seal member between one of the filtration drums and sidewalls of the storage tank for sealing a liquid level of the liquid along two side surface portions of said storage tank, thereby dividing the liquid level around the seal member into an upstream side and a downstream side, and for enabling said filtration drums to be rotatable in said filtration tank.

8. The apparatus according to claim 5, further comprising floating settling out means provided on outer circumferences of said filtration drums to cause floating cuttings to settle in said storage tank, and wherein said filtration drums are rotatably supported in said storage tank so as to avoid gaps between said filtration drums and sides of said storage tank, thereby allowing different liquid levels to exist on either side of the filtration drum.

9. The apparatus according to claim 5, wherein said storage tank is formed to be obliquely inclined upward from an intermediate portion between an upstream side and a downstream side, said discharge port is formed at an uppermost portion, and said dip-up means is disposed along said storage tank.

10. The apparatus according to claim 5, wherein said dip-up means comprises a sprocket and a guide member disposed in said storage tank to share a drive source with drive means that drives said filtration drums, drum sprockets fixed to said filtration drums, endless chains meshing with said sprocket and said drum sprockets and guided by said guide member, and one drive motor for driving said sprocket.

11. A fractional filtration apparatus for fractionally filtering a solid, in accordance with a shape or particle size of the solid, from a liquid, the solid being generated after the liquid is used by industrial machines to form a mixture of the solid and the liquid, thereby enabling re-use of the liquid, said apparatus comprising:

a plurality of liquid tanks for storing fractionally filtered liquids;

a storage tank for temporarily storing the mixture of the solid and the liquid;

a fractional filtration drum, rotatably supported in said storage tank, said drum having side-surface openings on two surfaces thereof in order to let fractionally filtered liquid flow into corresponding liquid tanks, and further having a partition wall within said filtration drum and filtering means of different mesh sizes provided on an outer circumferential surface of the filtration drum on either side of the partition wall in a longitudinal direction thereof;

injecting means for washing said filtering means; and dip-up means for continuously conveying the solid downward from a charge port of the turbid liquid and causing the solid to drop through a discharge port.

12. The apparatus according to claim 11, further comprising a dynamic seal member between the filtration drum and sidewalls of the storage tank for sealing a liquid level of the liquid or a liquid material from two side surface portions of said storage tank, thus dividing the liquid level into an upstream side and a downstream side, and for enabling said filtration drum to be rotatable in said filtration tank.

13. The apparatus according to claim 11, further comprising floating settling out means provided on an outer circumference of said filtration drum to cause floating cuttings to settle in said storage tank, and wherein said filtration drum is rotatably supported in said storage tank so as to avoid gaps between said filtration drum and sides of said storage tank, thereby allowing different liquid levels to exist on either side of the filtration drum.

14. The apparatus according to claim 11, wherein said storage tank is formed to be obliquely inclined upward from an intermediate portion between an upstream side and a downstream side, said discharge port is formed at an uppermost portion, and said dip-up means is disposed along said storage tank.

15. The apparatus according to claim 11, wherein said dip-up means comprises a sprocket and a guide member disposed in said storage tank to share a drive source with drive means that drives said filtration drum, a drum sprocket fixed to said filtration drum, endless chains meshing with said sprocket and said drum sprocket and guided by said guide member, and one drive motor for driving said sprocket.

16. The apparatus according to claim 11, wherein said apparatus comprises a plurality of liquid tanks for fractionally storing liquid materials, and a storage tank for temporarily storing the turbid liquid, and said fractional filtration drum is disposed on an upstream or downstream side of rotatably driven filtration drums which are rotatably supported in said storage tank, each having a side-surface opening open to at least one surface thereof in order to let the filtered liquid material to flow into a corresponding one of said liquid tanks, provided with filtering means of different mesh sizes, and at least corresponding in number to said liquid tanks.

\* \* \* \* \*